United States Patent Office 3,038,886
Patented June 12, 1962

3,038,886
CURING RUBBERY ACRYLATE POLYMERS CONTAINING ETHYLENE GLYCOL MONOACRYLATE OR MONOMETHACRYLATE
Robert A. Hayes, Cuyahoga Falls, Ohio, assignor to The Firestone Tire & Rubber Company, Akron, Ohio, a corporation of Ohio
No Drawing. Filed Aug. 22, 1957, Ser. No. 679,784
5 Claims. (Cl. 260—78.4)

This invention relates to cured elastomer copolymers of an alkyl acrylate and either ethylene, propylene or butylene glycol monoacrylate or monomethacrylate. The copolymer is cured with a cyclic dianhydride or other cyclic polyanhydride. These anhydrides are derived from polycarboxylic acids having carboxyl groups on adjacent carbon atoms. The invention relates to the cured elastomers and the method of curing them.

The glycol monoacrylate is advantageously formed by the reaction of an alkylene oxide with either acrylic acid or methacrylic acid. The reaction is described in Caldwell 2,484,487. According to a preferred procedure described in application Serial No. 663,900 filed June 6, 1957 1.05 to 1.50 molecular equivalents of oxide are reacted with 1.0 molecular equivalent of acid, using an alkaline catalyst, and the reaction is stopped when the acid number is 2 to 40. This process yields a more stable crude product than is obtained by the prior art.

The alkyl acrylate may be ethyl or any propyl, butyl, etc. acrylate up to any octyl acrylate. The acrylate is copolymerized with a small amount, e.g. 2 to 20 percent by weight of the glycol monoacrylate or monomethacrylate to produce an elastomeric chain with sufficient hydroxyl groups for curing with a cyclic polyanhydride.

The copolymer is cured with a cyclic polyanhydride. The degree of vulcanization is controlled in either of two ways:

(1) By preparing a copolymer containing a pre-determined number of hydroxyl groups. In that event reaction of all of the hydroxyl groups will result in the desired vulcanization. There is no danger of over vulcanization. In that case an excess of the curing agent may be employed.

(2) If the copolymer contains an excess of hydroxyl groups, the amount of the anhydride used for the vulcanization is limited so that only a certain number of hydroxyl groups per molecule are affected during the cure.

Cyclic dianhydrides which may be used for curing include pyromellitic acid dianhydride, 1,2,3,4-butanetetracarboxylic acid dianhydride, etc. These form diesters with the hydroxyl groups of the copolymer. Polyanhydrides may be used, as, for example, copolymers of maleic anhydride with styrene, isobutylene, vinyl acetate, vinyl ether, etc., in which there are two or more cyclic anhydride units per molecule. These form polyesters with the hydroxyl groups of the copolymer.

To produce a copolymer containing sufficient hydroxyl groups to produce a cured elastomer on reaction with a cyclic polyanhydride, one uses 2 to 20 percent by weight of the glycol monoacrylate to 98 to 80 percent of the alkyl acrylate.

The following example is illustrative of the preparation of the glycol monoacrylate, and of the copolymer, and comparative curing data is included. For brevity, EGMA will be used for ethyleneglycol monomethacrylate and EA-EGMA copolymer will be used for ethyl acrylate-ethyleneglycol monomethacrylate copolymer.

Preparation of EGMA

One hundred twenty nine grams of alpha-methacrylic acid (1.5 moles), 88 grams of ethylene oxide (2.0 moles), and 5 grams of solid sodium methacrylate (0.046 mole), as catalyst, were sealed in a bottle equipped with a rubber cap and shaken in a water bath at 70° C. After 27 hours, the bottle was removed from the water bath, cooled to room temperature and opened. Vacuum distillation of the crude reaction product yielded a pure product with a boiling point of 69 to 71° C. at 2.5 mm. of mercury pressure, an acid number of substantially zero, a saponification value of 131 and a refractive index, $20_D$, of 1.4531.

Production of EA-EGMA Copolymer

The elastomer copolymer was prepared by adding the following ingredients to a 28-ounce bottle:

| | Parts by weight |
|---|---|
| Ethyl acrylate | 96 |
| EGMA | 4 |
| Potassium persulfate | 0.4 |
| Aquarex Me[1] | 2 |
| Water | 180 |

[1] Aquarex ME is sodium lauryl sulfate.

The polymerization was carried out at 50° C. for 16 hours to 100 percent conversion, while shaking the bottle. The polymer was coagulated and washed in the conventional manner.

The amount of ethyl acrylate and glycol monoacrylate in the foregoing formula may be varied within the percentages given above for the overall composition of the elastomer. Other glycol monoacrylates and other alkyl acrylates may be used. Different catalysts, etc. may be used as is well known in the art.

In the following table two different cures are described. For brevity BTCD is used for 1,2,3,4-butanetetracarboxylic acid dianhydride. Different anhydride groups of the same polyanhydride molecule react with hydroxyl groups in different copolymer molecules during the cure.

FORMULAS

| | | |
|---|---|---|
| EA-EGMA copolymer | 100 | 100 |
| HAF black | 50 | 50 |
| Stearic acid | 2 | 2 |
| BTCD | 4 | 4 |
| Zinc oxide | | 3 |

NOTE.—Cured 60 min. at 300° F.

TENSILE PROPERTIES AT 73° F.

| | | |
|---|---|---|
| 200% Modulus, p.s.i. | | 1,150 |
| Tensile, p.s.i. | 1,225 | 1,300 |
| Elongation, percent | 180 | 230 |

The foregoing shows that the polyanhydride reaction gives a cured elastomer of desirable properties.

The formulas are illustrative. A small amount of a third monomer, generally not in excess of 10 percent by weight may be used, but such terpolymers are considered herein to be the equivalent of the copolymers defined in the claims. The cured elastomer has good physical properties at elevated temperatures.

The invention is defined in the claims which follow.

What I claim is:
1. The process of producing an elastomer by curing a copolymer consisting essentially of substantially 80 to 98 percent of an alkyl acrylate and 20 to 2 percent of an ester of the class consisting of the ethylene, propylene and butylene glycol monoesters of acrylic and methacrylic acid polymerized therein, the alkyl group of the acrylate containing two to eight carbon atoms, which process comprises dry-blending the copolymer with a polyanhydride of a polycarboxylic acid which contains at least two cyclic anhydride groups per molecule, the number of such groups in the anhydride present being not substantially greater than the number of hydroxyl groups in the copolymer, and then heating and thereby curing the copolymer by reacting different anhydride groups of the same anhydride molecule with different copolymer molecules.

2. The process of claim 1 in which the anhydride is from the class consisting of pyromellitic acid dianhydride and 1,2,3,4-butanetetracarboxylic acid dianhydride.

3. The process of producing an elastomer by curing a copolymer derived from substantially 96 percent ethyl acrylate and 4 percent of ethylene glycol monomethacrylate, which process comprises dry-blending the copolymer with 1,2,3,4-butanetetracarboxylic acid anhydride, the number of the anhydride groups in the anhydride present being not substantially greater than the number of hydroxyl groups in the elastomer, and then heating and thereby curing the copolymer by reacting different anhydride groups of the same anhydride molecule with different copolymer molecules.

4. A cured elastomer copolymer which comprises essentially a polyester of (a) a copolymer of (1) 80 to 98 percent of alkyl acrylate and (2) 20 to 2 percent of glycol monoacrylate, said alkyl group containing 2 to 8 carbon atoms and the glycol monoacrylate being from the class consisting of the ethylene, propylene and butylene glycol monoesters of acrylic and methacrylic acids, cross-linked by (b) a carboxylic acid which contains four carboxylic groups capable of forming two cyclic anhydride groups.

5. A cured elastomer copolymer which is a polyester of 1,2,3,4-butanetetracarboxylic acid and a copolymer of (1) 80 to 98 percent of ethylacrylate and (2) 20 to 2 percent of glycol monoacrylate from the class consisting of the ethylene, propylene and butylene glycol monoesters of acrylic and methacrylic acids.

References Cited in the file of this patent

UNITED STATES PATENTS

| | | |
|---|---|---|
| 1,864,909 | Jaeger | June 28, 1932 |
| 2,129,722 | Woodhouse | Sept. 13, 1938 |
| 2,219,661 | Schnabel | Oct. 29, 1940 |
| 2,381,063 | Kung | Aug. 7, 1945 |
| 2,398,350 | Atwood et al. | Apr. 16, 1946 |
| 2,399,214 | Evans et al. | Apr. 30, 1946 |
| 2,524,432 | Dorough | Oct. 3, 1950 |
| 2,530,983 | Minter | Nov. 21, 1950 |
| 2,580,901 | Erickson | Jan. 1, 1952 |
| 2,585,323 | Elwell et al. | Feb. 12, 1952 |
| 2,681,897 | Frazier et al. | June 22, 1954 |
| 2,768,153 | Shokal | Feb. 24, 1955 |
| 2,772,251 | Hansen | Nov. 27, 1956 |
| 2,848,433 | Eirich | Aug. 19, 1958 |
| 2,857,354 | Fang | Oct. 21, 1958 |

FOREIGN PATENTS

| | | |
|---|---|---|
| 529,233 | Canada | Aug. 14, 1956 |

OTHER REFERENCES

Charlton: Modern Plastics, vol. 32, No. 1, Sept. 1954, pp. 155–161 and 240–243.

Turner: Paint Manufacture, vol. 26, No. 5, May 1956, pp. 157–162 and 176.